(12) United States Patent
Burgstaler et al.

(10) Patent No.: US 6,915,717 B2
(45) Date of Patent: Jul. 12, 2005

(54) COMPONENT FOR A MOTOR VEHICLE

(75) Inventors: Andree Burgstaler, Dielingen (DE);
Jan Dütz, Damme (DE); Simone Pätzold, Cappeln (DE)

(73) Assignee: ZF Lemforder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/089,256

(22) PCT Filed: Aug. 10, 2001

(86) PCT No.: PCT/DE01/02972
§ 371 (c)(1),
(2), (4) Date: Mar. 26, 2002

(87) PCT Pub. No.: WO02/14114
PCT Pub. Date: Feb. 21, 2002

(65) Prior Publication Data
US 2002/0184749 A1 Dec. 12, 2002

(30) Foreign Application Priority Data
Aug. 11, 2000 (DE) .......................... 100 40 043

(51) Int. Cl.$^7$ ................................. G05G 1/14
(52) U.S. Cl. ............................. 74/512; 74/513; 74/560; 411/508; 411/913; 403/150
(58) Field of Search ................................. 403/116, 117, 403/297, 326, 337, 315, 316, 317, 318, 329, 150, 151, 153, 154; 16/222, 223, 386; 74/560, 512, 513; 411/508, 509, 510, 913, 348

(56) References Cited

U.S. PATENT DOCUMENTS

| 1,131,085 A | * | 9/1915 | Reilly ........................ 411/334 |
| 2,292,128 A | | 8/1942 | King |
| 3,091,795 A | | 6/1963 | Budwig |
| 3,451,288 A | * | 6/1969 | Barton et al. .................. 74/512 |
| 4,354,298 A | * | 10/1982 | Tanaka et al. ................. 24/453 |
| 4,637,741 A | * | 1/1987 | Gillet ........................ 384/428 |
| 4,648,738 A | | 3/1987 | Thielen |
| 4,810,145 A | * | 3/1989 | Villas ........................ 411/206 |
| 4,819,500 A | | 4/1989 | Musumiya et al. |
| 4,883,319 A | | 11/1989 | Scott |
| 4,884,930 A | * | 12/1989 | Dobbeler ........................ 411/6 |
| 4,896,990 A | * | 1/1990 | Nakamura et al. .......... 403/162 |
| 5,069,586 A | | 12/1991 | Casey |
| 5,588,338 A | | 12/1996 | Carr et al. |
| 5,829,317 A | * | 11/1998 | Vreeken et al. ................ 74/560 |
| 5,855,146 A | * | 1/1999 | Papenhagen et al. ......... 74/560 |
| 5,871,286 A | | 2/1999 | Kern et al. |
| 5,921,144 A | * | 7/1999 | Williams et al. ............... 74/512 |
| 5,957,030 A | * | 9/1999 | Keller et al. ................ 92/13.41 |
| 2003/0002918 A1 | | 1/2003 | Burgstaler et al. |

FOREIGN PATENT DOCUMENTS

| CH | 583841 | * | 1/1977 |
| DE | 40 40 151 | | 7/1991 |
| DE | 4013284 | * | 10/1991 |
| DE | 19615487 | * | 4/1996 |
| DE | 195 31 733 | | 2/1997 |
| DE | 29703980 | * | 5/1997 |
| EP | 0 625 453 | | 11/1994 |
| EP | 0 659 615 | | 6/1995 |
| EP | 0 827 874 | | 3/1998 |
| FR | 0581648 | * | 7/1993 |

* cited by examiner

Primary Examiner—William C. Joyce
Assistant Examiner—Julie K. Smith
(74) Attorney, Agent, or Firm—McGlew and Tuttle, P.C.

(57) ABSTRACT

An assembly unit for a motor vehicle is provided with a lever arm arranged in a bearing block pivotably around an axis on a bolt fixed in mounts of the bearing block. The bearing block has at least one section opening or expanding in case of an accident as a consequence of force acting on the assembly unit. The bolt disengages the mounts as a consequence of the acting force. After the assembly of the assembly unit, the bolt, which has an at least two-part design, has at least one connection area, on which the individual bolt parts are engaged with one another in a positive-locking and nonpositive manner.

24 Claims, 3 Drawing Sheets

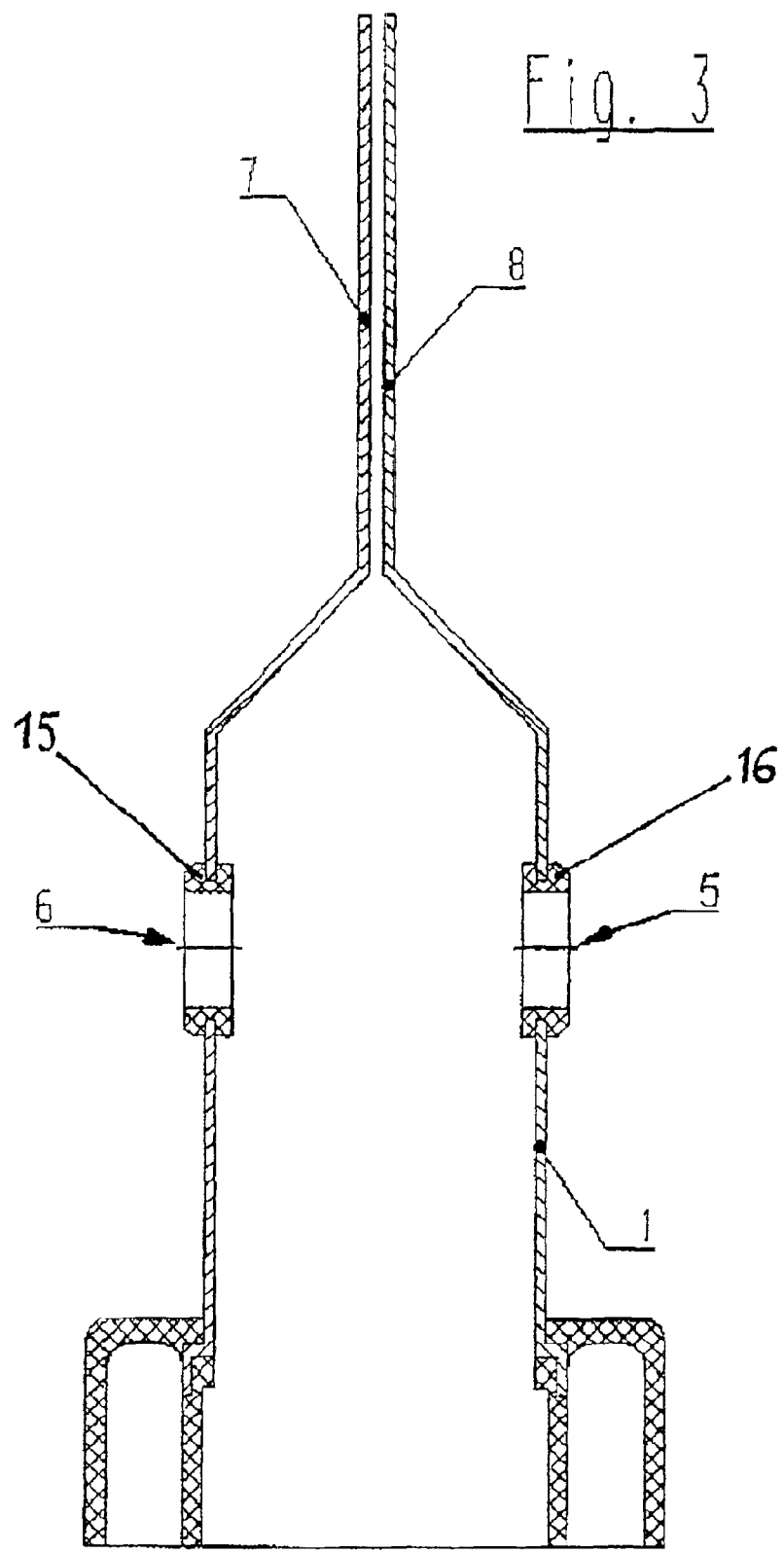

COMPONENT FOR A MOTOR VEHICLE

Figure 1:
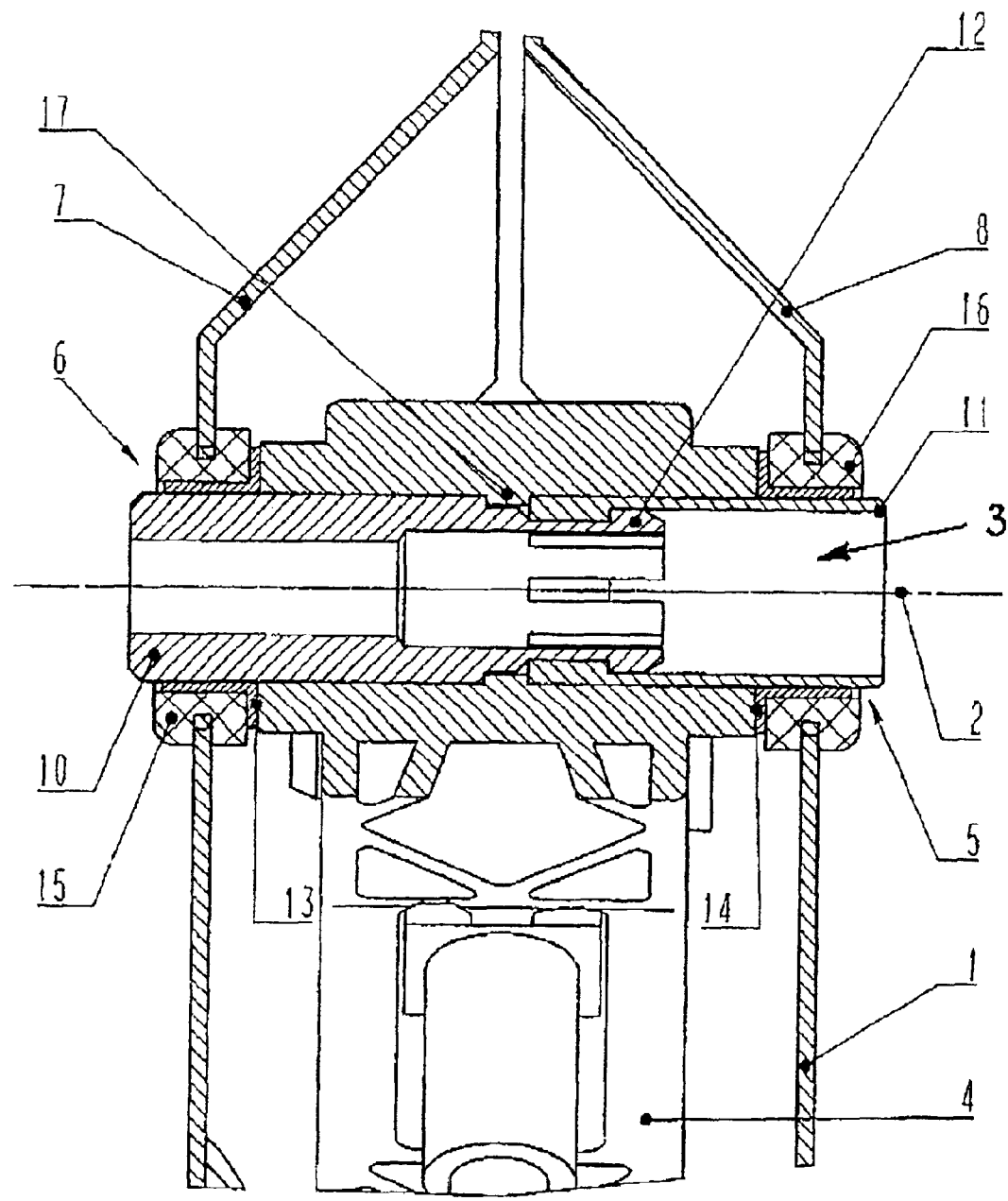

The present invention pertains to an assembly unit for a motor vehicle according to the preamble of patent claim 1.

The safety means used in motor vehicles for the protection of the occupants of the vehicle in case of an accident mostly pertain to the protection of the areas of the head and upper body. The sometimes severe injuries to the lower extremities are frequently ignored in the development of safety concepts. However, it has been known for a rather long time that especially in the case of a frontal impact of a motor vehicle, the occupants are not able to absorb the acceleration forces occurring, so that, among other things, the lower extremities of the persons sitting in the front area are thrown into the leg room area. The entire leg room may undergo an extreme deformation in the above-mentioned accident situation. The injuries developing as a consequence are painful for the person involved and may even lead to lifelong mutilation.

Various solutions have been known from the state of the art to counteract this circumstance and to reduce the hazard potential in the leg room of the motor vehicle. Thus, there are designs in which the pedals as a whole are removed from the hazard area, as a result of which the feet can be prevented from being jammed between the pedals and severe injuries are prevented as a result from occurring.

Other approaches to solve the problem are represented by the complete separation of the pedals. For example, an arrangement for mounting a pedal, which makes possible the separation of the pedals in case of an accident of the motor vehicle and the associated deformation of the front firewall, is known from EP 0 827 874 A2 or EP 0 659 615 A1. The embodiments described comprise a bearing block, in which the pedals pivotable around an axis are mounted on bolts. The bolt or bolts is/are in turn fixed in the mounts of the bearing block. The bearing block has at least one section that can expand, so that the force acting from the outside in case of an accident leads to a deformation of the front firewall and expands or spreads apart the bearing block as a consequence. The expansion may be brought about by means of a wedge-shaped element, which is driven in between the legs of the bearing block. The kinetic energy needed for this is obtained from the movement of the parts of the motor vehicle that are undergoing deformation in relation to one another during an accident. The bolts mounting the pedals are thus released, so that the pedals with the bolts can be removed from their bracket. The bearing block has two mounting points that are to be arranged separately and into which the bolt can be inserted. Two sheet metal flaps of the bearing block that cover one another are connected to one another by a screw connection. The two mounting points are first mounted opposite each other on the bearing block made of sheet metal, so that the bolt and the pedal can be inserted. The assembly unit must be held together during this assembly operation and be equipped with the above-mentioned screw connection from the top side.

Even though the risk of severe injuries to the lower extremities can be reduced with such a device, the assembly of the embodiments described in the documents is complicated and consequently expensive.

The basic technical object of the present invention is to provide an assembly unit for a motor vehicle which guarantees the reliable fastening of the lever arms to be mounted thereon as well as reliable separation of the said lever arms when needed and additionally has a simplified design and can consequently be assembled at a lower cost.

The technical object is accomplished with the features of patent claim 1.

Using the assembly unit according to the present invention, in which the bolt, which has an at least two-part design, has at least one connection area after the assembly, on which connection area the parts of the bolt are engaged with one another in a positive-locking and nonpositive manner, it is possible to considerably reduce the time needed for the assembly and to carry out the production in a cost-optimized manner. The entire assembly unit has a very simple design and may be manufactured from, e.g., plastic moldings. Moreover, a considerable weight reduction can be achieved due to the manufacture from a plastic. The mounts are simple and highly durable and meet all the requirements imposed in the manufacture of modern automobiles, especially all safety requirements. It is, of course, also possible to manufacture the bearing block as a whole from a metal, in which case at least the area of the bearing block than can be expanded preferably consists of sheet metal. Multicomponent materials, e.g., plastics with metal inserts or reinforcements by means of glass fibers are suitable for this purpose.

Furthermore, the additional safety elements for protection against loss, which are necessary in prior-art designs, may be eliminated in a solution according to the present invention. The protection against loss is achieved in a simple manner by the two-part design of the bolt, whose individual parts are engaged with one another.

The use of the assembly unit according to the present invention is, of course, not limited to the above-described purposes. It may rather be meaningful wherever a lever arm shall be detachably fastened between two legs of a bearing block and the kinetic energy necessary for expanding the bearing block can be made available.

Additional embodiments of the present invention are the subject of the subclaims.

Thus, the lever arm may be a pedal of a motor vehicle according to a variant of the object of the invention.

The connection between the bolt parts is preferably designed as an elastic snap connection, in which case it is proposed, furthermore, to provide the first bolt part with at least one slot on one side in order to guarantee the elasticity of the snap connection. This slotted end of the first bolt part, which is provided with hook-shaped areas, may have a taper, which comprises, e.g., a conical area, in its end area facing the second bolt part in order to facilitate the introduction into the second bolt part. Canting or jamming of the components is thus effectively prevented from occurring in a very simple manner. The conical area or the tapered area assumes a self-adjusting function during the assembly. Corresponding to the design according to the present invention, the second bolt part has an inner surface with an end-side engaging contour, behind which extend the above-mentioned hook-shaped areas of the first bolt part. Consequently, these engage one another with mutually complementary geometries in the connection area between the bolt parts.

According to another embodiment of the present invention, the lever arm is supported, when viewed in the axial direction of the bolt passing through it, with flange-like sections on both sides on bearing elements of the bearing block. Axial clearance and consequently an axial mobility of the lever arm on the bolt is avoided due to this support. Furthermore, the lever arm has on its inner surface a stop, with which contact surfaces of the bolt parts, which are associated with it, are in contact. Due to such a variant of the present invention, the mounting of the bolt in the bearing block can be established in the form of a sliding connection, so that complicated screw connections may be eliminated and the assembly is possible by means of a plug type connection. In addition, the rotatability of the lever arm and of the bolt around the central axis of the bolt is thus preserved. Another advantage of the slidingly movable mounting of the bolt within the bearing elements is that hardly any resistance is offered against the bearing block expanding in case of an accident. The bearing block would become deformed (dented) and it would thus release the bolt, so that the lever arm or the pedal can be reliably separated and the injuries which the driver of the vehicle could suffer in an accident and which could have serious consequences can be avoided. Prior-art slide bearings or even multilayer bearings which comprise a plurality of individual layers may be used for the sliding mounting.

The assembly operation for an assembly unit according to the present invention after the manufacture of the individual parts can be briefly described as follows:

The lever arm is first inserted between two legs of the bearing block equipped with the bearing elements and is in a position in which its through hole is aligned with the mounts or holes present in the legs of the bearing block.

The parts of the bearing bolt are subsequently inserted from the two outer sides of the bearing block; this can also be performed simultaneously. The parts of the bearing bolt are engaged with one another, so that the lever arm is already mounted in this state.

Only two basic steps are necessary for assembling the entire assembly unit.

A preferred embodiment of an assembly unit according to the present invention will be described in greater detail below with reference to the corresponding drawings. In the drawings, FIG. 1 shows a detail of a cross section through an assembly unit according to the present invention, FIG. 2 shows a bolt as an individual part, and FIG. 3 shows the bearing block as a metal-plastic composite component.

Figure 2:
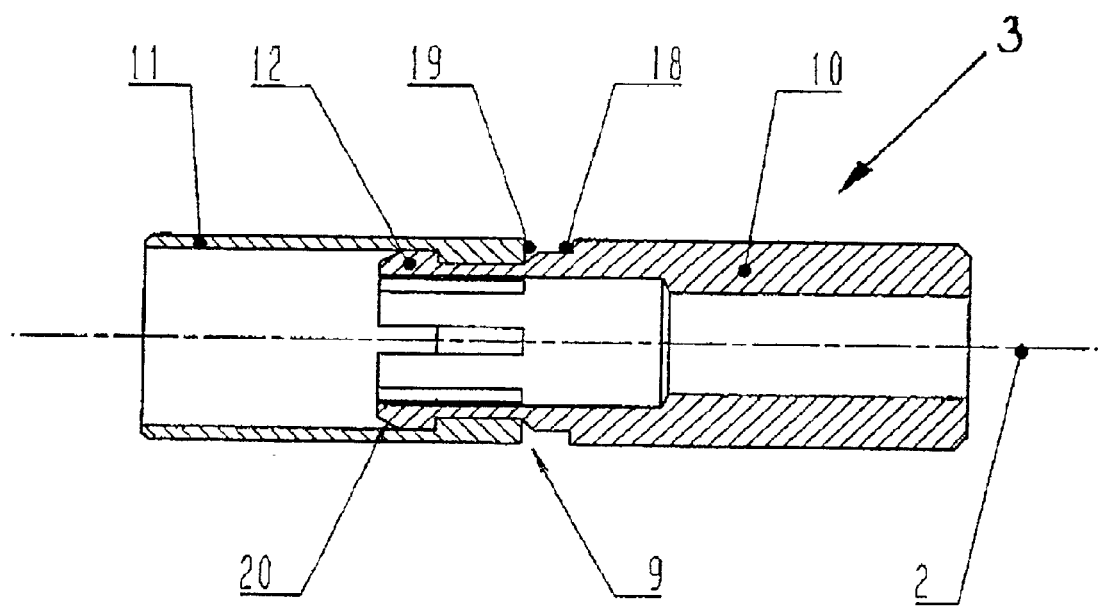

FIG. 1 shows a detail of a cross section through an assembly unit according to the present invention. A bearing block 1 shown as an individual part in FIG. 3 has two expandable sections 7 and 8. These can be expanded by a wedge surface in the known manner or driven apart in another manner in case of an accident.

The bearing block 1 comprises two approximately parallel legs, in which a respective mount 5 or 6 include a hole that is prepared in each of the sections 7 and 8 respectively. The holes of the mounts 5, 6 of the legs or sections 7 and 8 are flush with one another. A lever arm 4, which is a pedal of a motor vehicle in this case, is inserted between the legs of the bearing block 1. A bolt of a two-part design, which is designated by 3 is a whole, is used to mount the lever arm 4. The lever arm 4 is thus arranged on the bolt 3 pivotably around an axis 2.

Bearing elements 15 and 16 provided with a sliding layer on their inner circumference in the form of plastic moldings are inserted or fitted as slide bearings into the above-mentioned holes of the bearing block 1 to form the mounts. When viewed in the axial direction of the bolt 3, the bearing elements 15 and 16 thus form stops for contacting flange sections 13 and 14 of the lever arm 4. The lever arm 4 is mounted nondisplaceably between the legs of the bearing block 1 when viewed in the axial direction of bolt 3.

During the assembly, the bolt parts 10 and 11 of the bolt 3 are introduced from both outer sides into the holes of the mounts 5, 6 which are provided for this purpose and are equipped with the bearing elements 15 and 16.

The advantage of the slidingly movable mounting of the bolt 3, which is brought about with the bearing elements 15 and 16, is that hardly any resistance is offered to the bearing block 1 expanding in case of an accident. The bearing block 1 can become deformed (dented) and thus release the bolt 3, so that the lever arm 4 or the pedal can be separated and injury to the driver of the vehicle, which could occur in case of an accident and could have serious consequences, can be avoided.

Two bolt parts 10 and 11 engage one another in a connection area 9 of the bolt 3 in a positive-locking and nonpositive manner. The first bolt part 10 has for this purpose a slotted section in its end area, which slotted section is provided, moreover, with hook-shaped areas 12. On the side facing the second bolt part 11, the hook-shaped area 12 of the first bolt part 10 has a tapered section 20. This facilitates the introduction of the two bolt parts into one another during the assembly. The engaging contour of the second bolt part 11 is designed such that the hook-shaped areas of the first bolt part 10 extend behind it in the completely assembled state. A stop 17 on the inner surface of the lever arm 4 guarantees that the bolt 3 is captively mounted in the assembly unit. This bolt has respective contact surfaces 18 and 19 on its bolt parts 10 and 11, and these contact surfaces 18 and 19 are supported at the stop 17 in the assembled state.

Besides the embodiments shown in the figures, in which the bolt parts engage one another by means of hook-shaped sections, it is, of course, also possible to select other embodiments for connecting the two bolt parts. For example, a bayonet catch-like connection, a threaded area or similar types of connection are possible.

LIST OF REFERENCE NUMBERS

1 Bearing block
2 Axis
3 Bolt
4 Lever arm
5 Mount (hole)
6 Mount (hole)
7 Expandable section
8 Expandable section
9 Connection area
10 First bolt part
11 Second bolt part
12 Hook-shaped area
13 Flange section
14 Flange section
15 Bearing element
16 Bearing element
17 Stop
18 Contact surface
19 Contact surface
20 Taper (cone)

What is claimed:

1. An assembly unit for a motor vehicle, the assembly unit comprising: a bearing block having mounts each with an inner diameter; a bolt having a length and with an outer diameter that is less than or equal to said inner diameter over the entire length of the bolt; and a lever arm arranged in said bearing block pivotably around an axis of said bolt fixed in said mounts, said lever arm comprising a pedal, said bearing block having at least one section with means for opening, deforming or expanding in case of an accident as a consequence of force acting on the assembly unit, so that the bolt disengages from said mounts as a consequence of said outer diameter of said bolt being less than or equal to said inner diameter of said mounts and the acting force opening, deforming or expanding said section, said bolt having an at least two-part design comprising a first part not made in one piece with the bearing block and a second part not made in one piece with the bearing block, said first part being a separate part from said second part, each of said first part and said second part having at least one connection area on which individual first part and said second part are engaged with one another in a positive-locking and nonpositive manner.

2. An assembly unit for a motor vehicle in accordance with claim 1, wherein each engaging contour is arranged within a region of said lever arm.

3. An assembly unit for a motor vehicle in accordance with claim 1, wherein the connection area between said individual bolt parts is an elastic snap connection.

4. An assembly unit for a motor vehicle in accordance with claim 3, wherein said elastic snap connection is arranged within a region of said lever arm.

5. An assembly unit for a motor vehicle in accordance with claim 1, wherein said first bolt part has an end slotted at least once with hook-shaped areas facing tapering sections of said second bolt part.

6. An assembly unit for a motor vehicle in accordance with claim 5, wherein on the end side said second bolt part has an engaging contour, behind which extend said hook-shaped areas of said first bolt part.

7. An assembly unit for a motor vehicle in accordance with claim 1, wherein said mounts include bearing elements for mounting said bolt rotatably and slidingly, said bearing elements being inserted into openings of said bearing block.

8. An assembly unit for a motor vehicle in accordance with claim 7, wherein said bearing elements are multilayer bearings.

9. An assembly unit for a motor vehicle in accordance with claim 7, wherein said lever arm is supported with flange-like sections at said bearing element of said bearing block on both sides when viewed in an axial direction of said bolt and said lever arm has a stop on an inner contour, said stop forming a contact surface with associated contact surfaces of said bolt.

10. An assembly unit for a motor vehicle, the assembly unit comprising:
    a lever arm;
    a bearing block having mounts having an inner diameter and with at least one section with section opening means for opening, deforming or expanding in case of an accident to move said mounts apart as a consequence of force acting on the assembly unit; and
    a bolt having an outer diameter having a maximum size that is less than or equal to said inner diameter of said mounts over an entire length of said bolt said bolt, being supported in said mounts so as to disengage from said mounts as a consequence of the section opening, deforming or expanding from the acting force of an accident and as a consequence of said outer diameter of said bolt being less than or equal to said inner diameter of said mounts, said lever arm being arranged in the bearing block pivotable around an axis of said bolt, said bolt comprising a first part with an engaging contour engaged with a separate second part with a tubular portion having an engaging contour on an inside of said second part.

11. An assembly unit for a motor vehicle in accordance with claim 10, wherein each engaging contour is arranged within a region of said lever arm.

12. An assembly unit for a motor vehicle in accordance with claim 10, wherein said lever arm comprises a pedal.

13. An assembly unit for a motor vehicle in accordance with claim 10, wherein the connection between said individual bolt parts is an elastic snap connection.

14. An assembly unit for a motor vehicle in accordance with claim 10, wherein said first bolt part has an end slotted at least once with hook-shaped areas and a side facing said second bolt part with tapering sections.

15. An assembly unit for a motor vehicle in accordance with claim 14, wherein on the end side said second bolt part has an inwardly directed engaging contour with said hook-shaped areas of said first bolt part extending behind said engaging contour.

16. An assembly unit for a motor vehicle in accordance with claim 10, further comprising bearing elements for mounting said bolt rotatably and slidingly, said bearing elements being inserted into holes of said bearing block to form said mounts.

17. An assembly unit for a motor vehicle in accordance with claim 16, wherein said bearing elements are multilayer bearings.

18. An assembly unit for a motor vehicle in accordance with claim 16, wherein said lever arm is supported with flange-like sections at said bearing element of said bearing block on both sides when viewed in an axial direction of said bolt and said lever arm has a stop on an inner contour, said stop forming a contact surface with associated contact surfaces of said bolt.

19. An assembly unit for a motor vehicle in accordance with claim 13, wherein said elastic snap connection is arranged within a region of said lever arm.

20. An assembly unit for a motor vehicle, the assembly unit comprising:
    a lever arm;
    a bearing block having a first opening and a second opening;
    a first bearing element supported at said first opening to form a first mount having an a first bearing inner diameter;
    a second bearing supported at said second opening to form a second mount having a second bearing inner diameter;
    accident expansion means associated with at least one section of said bearing block, said accident expansion means for opening, deforming or expanding said section in case of an accident as a consequence of force acting on the assembly unit and for moving said first mount with respect to said second mount;
    a bolt comprising a first bolt part mounted in said first bearing with a mount support end having an outer diameter of a size less than or equal to said first bearing inner diameter and with a separate second part mounted in said second bearing with a mount support end having an outer diameter of a size less than or equal to said second bearing inner diameter allowing said bolt to disengage from said bearings as a consequence of the section opening, deforming or expanding from the acting force of an accident, said first bolt part having an engaging contour and said second bolt part having an engaging contour forming a bolt connection, said first bolt part engaging contour engaging said second part engaging contour to connect said first bolt part to said second bolt part to form said bolt with said lever arm being arranged in the bearing block pivotable around said bolt, said bolt having a recess contact surface and said lever arm having a stop on an inner contour, said stop forming a stop contact surface with said recess contact surface of said bolt.

21. An assembly unit for a motor vehicle in accordance with claim 20, wherein said lever arm comprises a pedal.

22. An assembly unit for a motor vehicle in accordance with claim 20, wherein the connection between said individual bolt parts is an elastic snap connection.

23. An assembly unit for a motor vehicle in accordance with claim 22, wherein said first bolt part has an engaging countour with end slotted at least once with hook-shaped areas at a side facing said second bolt part with tapering sections and said second bolt part has an engaging countour with hook-shaped areas of said first bolt part extending behind said engaging contour.

24. An assembly unit for a motor vehicle in accordance with claim 20, further comprising a flange-like section at each said bearing element of said bearing block.

* * * * *